Dec. 20, 1966 E. H. REPLOGLE 3,292,744
RESTRAINT APPARATUS
Filed April 3, 1963 4 Sheets-Sheet 1
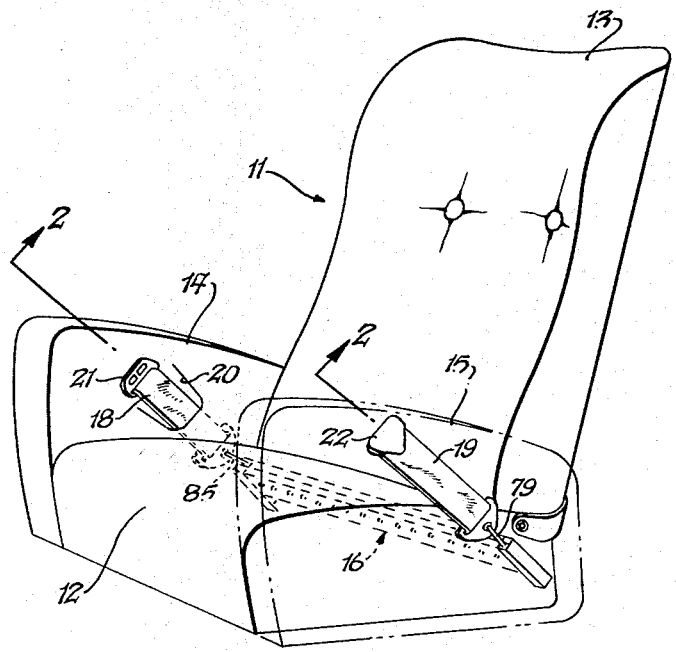
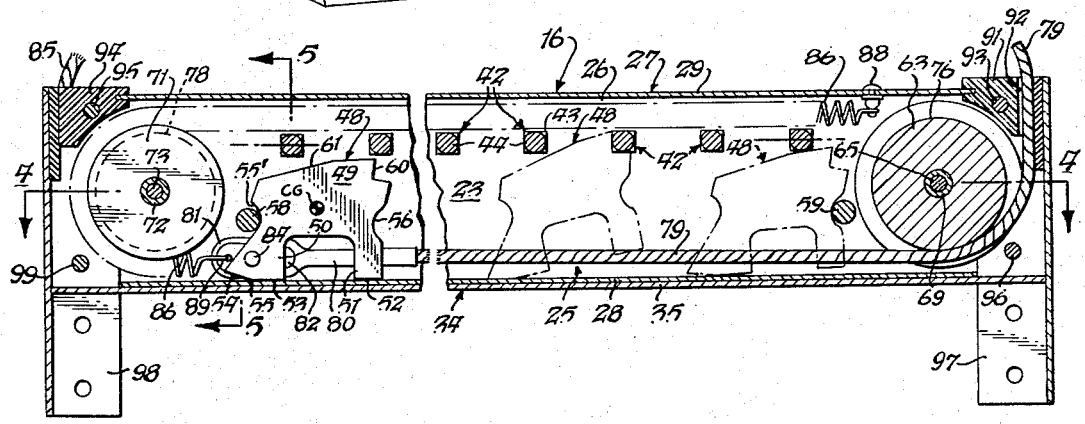
INVENTOR.
EDWARD H. REPLOGLE
BY
Popp and Sommer
ATTORNEYS Dec. 20, 1966  E. H. REPLOGLE  3,292,744
RESTRAINT APPARATUS
Filed April 3, 1963  4 Sheets-Sheet 2
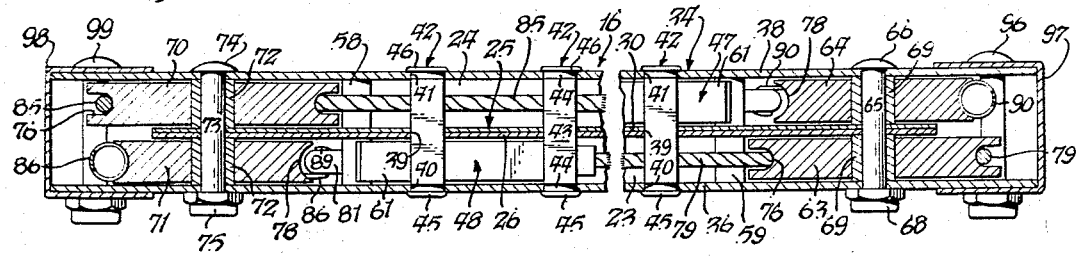
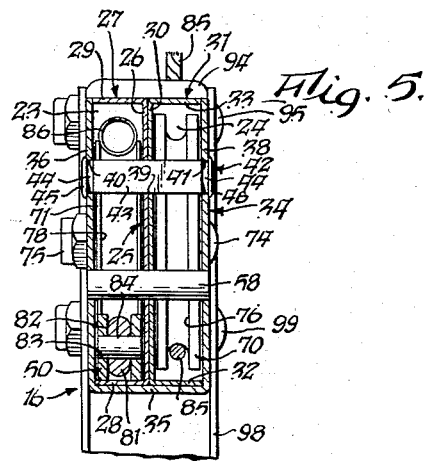
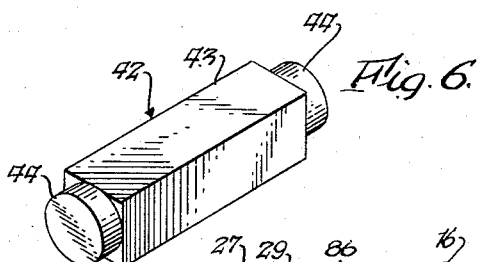
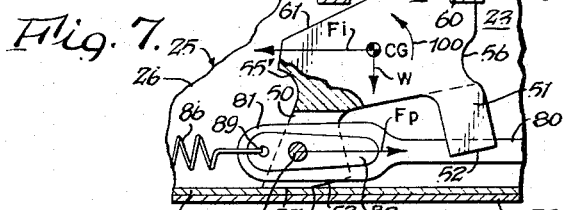
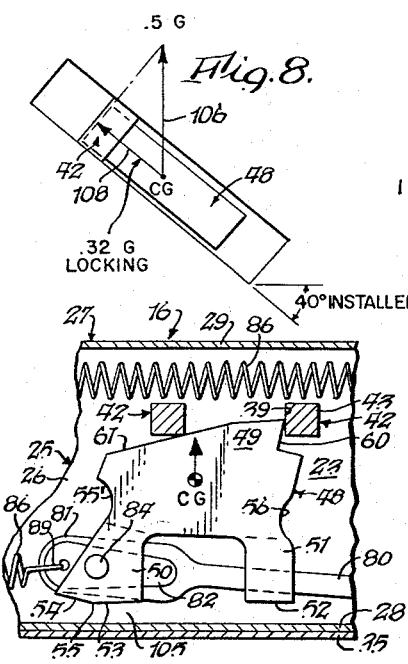
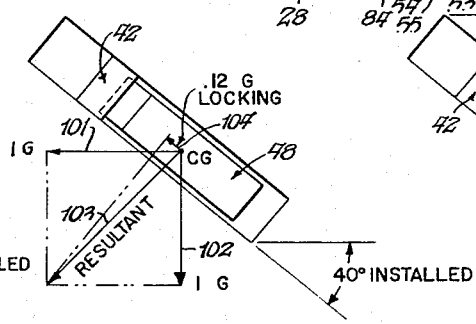
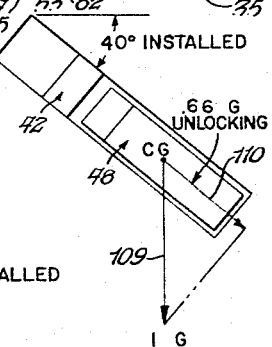
INVENTOR.
EDWARD H. REPLOGLE
BY
Popp and Sommer
ATTORNEYS

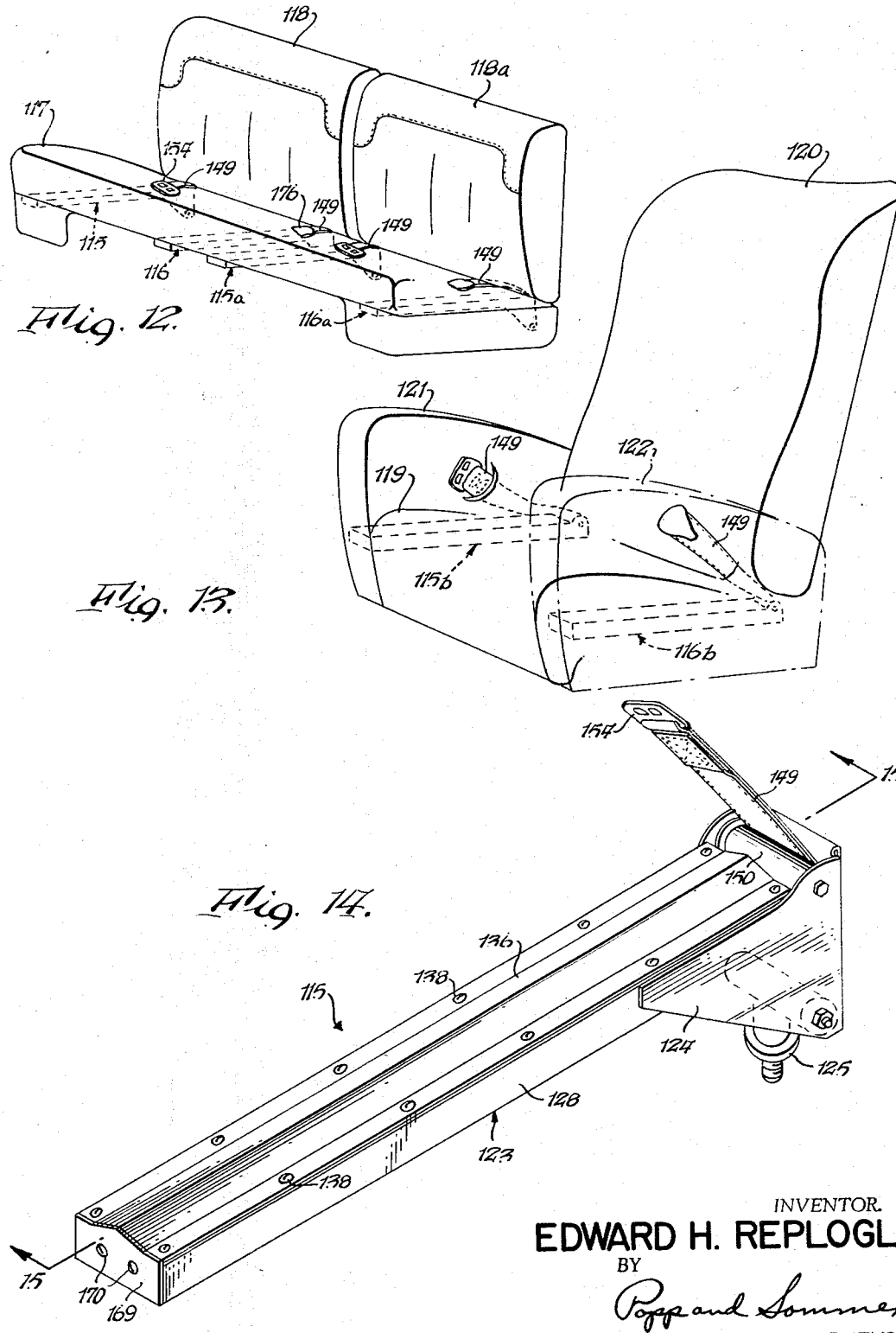

Dec. 20, 1966  E. H. REPLOGLE  3,292,744
RESTRAINT APPARATUS
Filed April 3, 1963  4 Sheets-Sheet 4
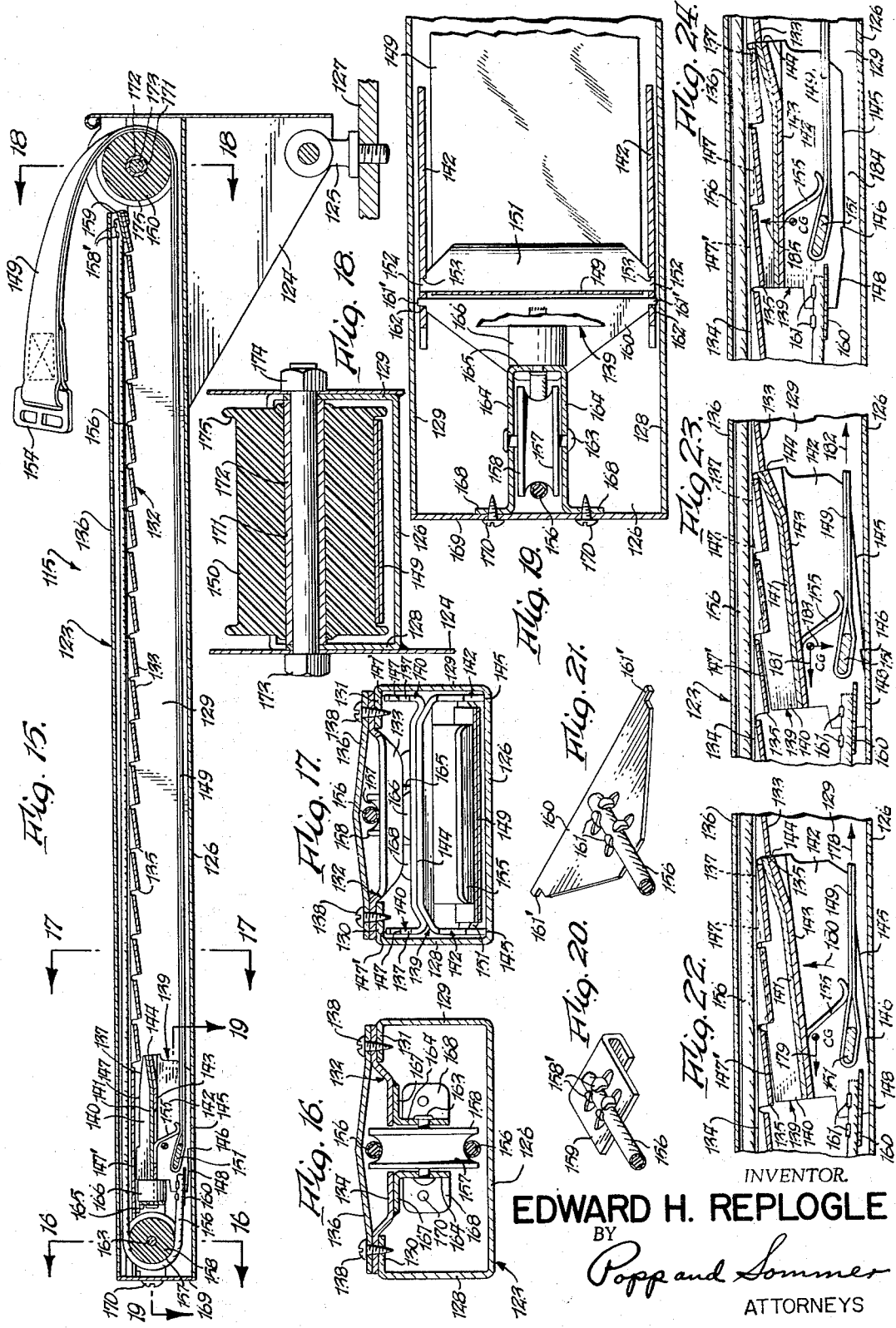
INVENTOR.
EDWARD H. REPLOGLE
BY
Popp and Sommer
ATTORNEYS _United States Patent Office_

3,292,744
Patented Dec. 20, 1966

3,292,744
RESTRAINT APPARATUS
Edward H. Replogle, 7174 Transit Road,
Buffalo, N.Y. 14221
Filed Apr. 3, 1963, Ser. No. 270,250
20 Claims. (Cl. 188—135)

This invention relates to improvements in restraint apparatus, and more particularly to such apparatus of the type associated with a passenger supporting chair in a vehicle such as an airplane or automobile and including a restraining element such as a belt which engages the body of the passenger to hold the wearer to the chair.

An important object of the present invention is to provide such restraint apparatus in which the restraining element when worn by a passenger can be paid out relatively freely to permit substantially unrestricted maneuverability of the passenger in his chair but yet when the payout acceleration of the restraining element exceeds a predetermined value, as may be occasioned by a rapid deceleration of the vehicle carrying the passenger, further payout of the restraining element is prevented so as to hold the passenger to his chair.

Another object is to provide such restraint apparatus which is momentum sensitive, that is, will lock up even though the restraining element is not being pulled out by the wearer's body when the deceleration of the vehicle equipped with the apparatus in a given direction such as forward exceeds a predetermined value, thus providing added safety.

Another object is to provide such restraint apparatus which is gravity sensitive and thereby locks up even though the restraining element is not being paid out, thus enabling the passenger to be held to the seat portion of his chair, if the vehicle such as an airplane in which the chair is mounted descends so rapidly as to impose negative or upward gravity upon the passenger which tends to lift him off the seat portion of his chair.

Another object is to provide such restraint apparatus which can be designed so as to have the degree of sensitivity desired both with respect to payout acceleration of the restraining element and forward momentum, and also to gravity.

A further aim is to provide such restraint apparatus which can be conveniently incorporated into passenger chairs of conventional construction with a minimum of modification of the chair in order to enable the operating mechanism of the apparatus to be concealed.

Another object of the invention is to provide such restraint apparatus in which the restraining element is automatically retrieved when disconnected so as no longer to be in its passenger confining operative condition.

Another object is to provide such a restraint apparatus for a passenger chair having arm rests and in which the restraining element is made in two sections with each section being arranged to be pulled out from the inside surface of the corresponding arm rest and when released to be automatically retrieved to a ready-to-grasp, slightly exposed position.

A further object is to provide such a restraint apparatus in which the exposed ends of the two restraining element sections may be readily and easily detachably connected and thereby eliminate any useless extra free portion as is common with some conventional lap belts.

Still a further object is to provide such restraint apparatus which is simple in construction considering the function it performs, and hence relatively inexpensive to manufacture, and which is also strong and durable in construction and not likely to get out of order or to require repair.

Still further objects and advantages will be apparent from the following detailed description of embodiments of the present invention taken in conjunction with the arcompanying drawings wherein:

FIG. 1 is a perspective view of a passenger chair representative of the type found in a commercial airplane and shown as equipped with one form of restraint apparatus constructed in accordance with the principles of the present invention;

FIG. 2 is an enlarged fragmentary longitudinal sectional view through the restraint apparatus shown in FIG. 1 and taken generally along line 2—2 thereof;

FIG. 3 is an enlarged perspective view of a lock member which is a component of the inventive restraint apparatus shown in FIG. 2;

FIG. 4 is a fragmentary transverse sectional view of that portion of the apparatus shown in FIG. 2 and taken on line 4—4 thereof;

FIG. 5 is a vertical transverse sectional view thereof, taken generally along line 5—5 of FIG. 2;

FIG. 6 is an enlarged perspective view of an elongated abutment member which is another component of the inventive restraint apparatus and shown in FIGS. 2, 4 and 5;

FIG. 7 is an enlarged fragmentary sectional view similar to FIG. 2 and showing the lock member pivoted into a locked up condition as a result of excessive payout acceleration of the restraining element, and illustrating diagrammatically the inertial lockup couple which effected the pivotal motion;

FIG. 8 is a diagrammatic view representing a vertical transverse sectional view of the inventive restraint apparatus shown in the preceding figures, comparable to FIG. 5 except for angular disposition, and illustrating the condition of the lock member when subjected to negative or upward gravity of .5G, and including a vector analysis of the locking force;

FIG. 9 is a diagrammatic view similar to FIG. 8 but illustrating the momentum sensitivity of the lock member and its condition when subject to a deceleration in a forward or leftward direction of 1G, while being also subject to the normal downward weight effect of 1G, and also showing a vector analysis of the locking force;

FIG. 10 is a longitudinal view similar to FIG. 2 but showing the lock member translationally moved upwardly toward the abutment members into an impending locked up condition with one thereof due either to its negative gravity sensitivity limit having been exceeded as illustrated diagrammatically in FIG. 8 or to its momentum sensitivity limit having been exceeded as illustrated diagrammatically in FIG. 9;

FIG. 11 is a diagrammatic view similar to FIGS. 8 and 9 but showing the condition of the lock member when subjected only to the normal downward weight effect of 1G and including a vector analysis of the unlocking force;

FIG. 12 is a perspective view of a typical double occupancy automobile seat shown equipped with another form of restraint apparatus constructed in accordance with the principles of the present invention;

FIG. 13 is a perspective view of a passenger chair of the airplane type and shown equipped with restraint apparatus similar to that shown in FIG. 12;

FIG. 14 is an enlarged perspective view of one of the restraint assemblies shown in FIG. 12;

FIG. 15 is a longitudinal central sectional view thereof, taken on line 15—15 of FIG. 14;

FIG. 16 is a vertical transverse sectional view thereof, on an enlarged scale, taken on line 16—16 of FIG. 15;

FIG. 17 is a vertical transverse sectional view thereof, on an enlarged scale, taken on line 17—17 of FIG. 15;

FIG. 18 is an enlarged fragmentary vertical transverse sectional view thereof taken on line 18—18 of FIG. 15·

FIG. 19 is an enlarged fragmentary horizontal sectional view thereof, taken generally on line 19—19 of FIG. 15;

FIG. 20 is an enlarged perspective view of the clip shown in FIG. 15 for anchoring one end of the return spring, such spring being fragmentarily illustrated;

FIG. 21 is an enlarged perspective view of the means for anchoring the other end of the return spring to the lock member as shown in FIG. 15, the spring being fragmentarily illustrated;

FIG. 22 is an enlarged fragmentary vertical sectional view similar to FIG. 15 and showing the lock member in an intermediate position along its path and pivoted into a locked up condition as a result of excessive payout acceleration of the restraining element, and illustrating diagrammatically the inertial lock up couple which effected the pivotal motion;

FIG. 23 is a view similar to FIG. 22 but illustrating with vectors the locking forces due to momentum, sufficient to lock up the lock member;

FIG. 24 is a view generally similar to FIGS. 22 and 23 but illustrating the lock member in an impending locked up condition as a result of the negative gravity or upward acceleration thereon and illustrating the vector which causes upward movement of the lock member relative to its frame.

FIGS. 1–11

Referring to FIG. 1, the numeral 11 represents a passenger supporting chair having a seat portion 12, a back portion 13, a first arm rest 14 and a second arm rest 15, the latter being phantomly illustrated by broken lines. Such a chair may be of any suitable construction except as modified to incorporate the inventive restraint apparatus, as hereinafter explained.

The numeral 16 represents generally the frame of the inventive restraint apparatus which also includes a restraining element shown as a lap belt having a first section 18 and a second section 19 severally operatively associated with mechanism mounted on the frame 16 as hereinafter explained. The lap belt section 18 is shown as being partially arranged inside and outside the arm rest 14, extending through an opening 20 provided in the inside surface of this arm rest. The other lap belt section 19 is similarly arranged with respect to arm rest 15. The outer or free ends of the lap belt sections 18 and 19 are shown as being provided with a quick connect and disconnect, manually operated fastener or coupling of any suitable construction, including an eye portion 21 arranged on the outer end of the lap belt section 18 and a hook portion 22 suitably arranged on the outer end of the other lap belt section 19.

Referring to FIGS. 2, 4 and 5, the frame 16 is constructed so as to provide two elongated compartments 23 and 24 arranged side by side and separated from each other by an inner or dividing wall 25. This wall 25 is preferably made up of the upright web 26 of a relatively shallow, relatively broad sheet metal channel member 27 which has a lower perpendicular flange 28 and an upper perpendicular flange 29, and also the upright web 30 of a similar channel member 31 having lower and upper perpendicular flanges 32 and 33, respectively. The webs 26 and 30 are arranged back-to-back in contact with each other and their respective lower flanges 28 and 32 extend laterally outwardly in alinement with each other, as do also their respective upper flanges 29 and 33.

The channel members 27 and 31 so arranged back-to-back are confined within a housing member 34, also preferably of channel shape in cross section, and as such is shown as including a web 35 and first and second flanges 36 and 38. The web 35 serves as a base for the lower flanges 28 and 32. The flange 36 engages the outer edges of the flanges 28 and 29 and serves as a cover plate for the shallow channel member 27. In a similar way, the other flange 38 of the housing engages the flanges 32 and 33 and serves as a cover plate for the other shallow channel member 31. Thus the elements 26, 28, 36 and 29 define the first compartment 23, and the elements 30, 32, 38 and 33 define the other compartment 24.

The assembly of channel members 27, 31 and 34 is held together in the following manner. In the upper portions of the chambers 23 and 24, the webs 26 and 30 constituting the inner wall 25 are severally provided with a series of longitudinally spaced transverse holes 39 which have a central axis which is coaxial with the axes of cylindrical transverse holes 40 and 41 provided in the cover plates 36 and 38, respectively. The alined holes 39, 40 and 41 are severally adapted to receive different portions of an elongated rivet represented generally by the numeral 42 and one of which is illustrated in perspective in FIG. 6. The rivet 42 comprises an elongated central part 43, out-of-round in cross section, and a cylindrical neck part 44 at each end, one of which is adapted to extend through the hole 40 in the cover plate 36 and to be peened over to provide the rivet head 45, and the other neck 44 being adapted to extend through the hole 41 in the other cover plate 38 and to be peened over to provide the rivet head 46. While the intermediate out-of-round part 43 of the rivet is shown as being rectangular in cross section, specifically square, any other shape may be employed to prevent rotation of the rivet when mounted as shown in FIG. 5. In this connection, the hole 39 in the inner wall 25 has a shape corresponding to that of the cross section of the intermediate rivet part 43 so that this portion can slide through the hole 39 but yet fit such hole so as not to turn therein. The rivets 42 provide abutment members as explained later herein.

A lock member represented generally by the numeral 48 is movably arranged in the compartment 23 below the row of transverse rivets 42, and a similar lock member 47, although facing the opposite direction, is similarly disposed in the other compartment 24. Except for orientation, each of the lock members 47 and 48 is identical to the other and hence a description of one such as 48 will suffice since applicable to the other.

Referring to FIG. 3 which illustrates a perspective enlargement of the lock member 48, the same is shown as having a block-like body 49 having parallel flat side surfaces and formed to provide a first pair of transversely spaced depending rear legs 50, 50 and a second pair of transversely spaced depending front legs 51, 51. The foot ends or lower surfaces of the front legs 51 are severally flat as shown at 52. The foot end or lower surface of each rear leg 50 is shown as including a flat toe surface 53 and a flat heel surface 54 inclined upwardly and rearwardly with respect to the toe surface 53 thereby providing an intermediate salient or corner 55. The toe surfaces 53 are shown as being parallel and coplanar with each other and with the foot surfaces 52 of the front legs 51. In fact all surfaces 52 and 53 might be considered collectively a toe portion. The heel surfaces 54 are parallel and coplanar with each other and incline upwardly and rearwardly from the respective salients 55 which are thereby in transverse alinement. The heel surfaces 54 might be considered collectively a heel portion.

The rear end of the lock member 48 is shown as having a transversely extending recess 55' of rounded contour. A somewhat similar rounded recess 56 extends transversely across the front end of the lock member. These recesses 55' and 56 are adapted to engage transverse rear and front stop pins 58 and 59, respectively, as will be explained later herein. The transverse stop pins 58 and 59 extend across both compartments 23 and 24 and are suitably mounted in transversely alined holes in the various frame walls 36, 25 and 38.

The upper front corner of the lock member 48 is shown as provided with a rectangular cutout leaving a lock notch 60. This notch 60 is adapted to engage or lock up against the opposing external portion of the intermediate part 43 of any of the rivets 42 located in the compartment in which the lock member is movable. Thus, the intermediate parts 43 of the rivets 42 serve as abutment members, that portion of these rivets in the compartment 23 serving as abutment members for the lock member 48 and that portion of the rivets located in the other compartment 24 serving as abutment members for the other lock member 47.

The upper surface of the body 49 of the lock member 48 is shown as inclined rearwardly and downwardly as indicated at 61. This inclined surface has a ratchetting effect against the abutments or rivets 42 when the lock member 48 is retrieved or moved from right to left as viewed in FIG. 2, should this lock member be oriented so that contact between the surface 61 and the abutments or rivets is possible.

Each of the lap belt sections 18 and 19 is shown as having a connecting element suitably attached to the corresponding lock member 47 or 48. This is shown as effected in both cases by a substantially non-linearly elastic flexible connector, such as a length of metal cable, represented at 79 for the lock member 48 and at 85 for the lock member 47. These cables 79 and 35 at one end are suitably connected to the belt sections 19 and 18, respectively. Also, each of the lock members 47 and 48 is operatively associated with a return spring means to retrieve the corresponding lock member when the pull out force thereon by the corresponding belt element is released. The return spring device for the lock member 48 is identified by the numeral 86; for the lock member 47 by the numeral 90.

For guiding the movements of the cables 79, 85 and springs 86, 90, two guide wheels 63 and 64 are arranged severally in the compartments 23 and 24, respectively, at that end of the row of rivets 42 adjacent the stop pin 59. The wheels 63 and 64 are shown as rotatable about a common transverse axis generally parallel to the axes of the rivets 42. More specifically, the walls 36, 25 and 38 of the frame are provided with transversely alined holes to receive an axle 65. The cylindrical shank of a machine bolt serves as this axle 65, this bolt having a head 66 at one end and being threaded at its opposite end to receive a nut 68. Each of the wheels 63 and 64 is shown as bushed with a sleeve bearing 69 which embraces a portion of the axle 65. Each bushing 69 is slightly longer axially than the corresponding guide wheel 63 or 64 is wide so that when the nut 68 is tightened the bushings are clamped between the frame walls and the guide wheels are left freely rotatable on the bushings.

A similar pair of coaxial guide wheels 70 and 71 are rotatably mounted in a similar manner on the frame adjacent the other end of the row of rivets 42, or adjacent the stop pin 58. Thus, the wheels 70 and 71 severally have bearing sleeves 72 surrounding the shank of an axle bolt 73 having a head 74 at one end and threaded at its opposite end to receive a nut 75.

Referring to FIG. 4, it will be seen that the wheels 63 and 70 which are similar to each other severally have a peripheral groove therein as indicated at 76. The other two wheels 64 and 71 are similar to each other but smaller in diameter than the wheels 63 and 70 and severally have a peripheral groove 78, this groove being wider than the grooves 76.

The cable 79, which at one end is suitably secured to the lap belt section 19, passes partially around the wheel 63, being arranged in the groove 76 therein. The other end of this cable 79 has a suitable termination fitting 80 to which the cable is suitably secured. The rear end portion of this fitting 80 is enlarged to provide a head 81 having flat and parallel upright surfaces 82 on opposite sides thereof. The fitting 80 extends between the front and rear legs 51 and 50, respectively, with the flat sides 82 opposing the inner flat sides of the rear legs 50. Alined transverse holes 83 provided in the rear legs 50 receive a pivot pin 84 which is carried by the head 81. The pin 84 may be either rotatable in the holes 83, or this pin may be non-rotative with respect to these holes but extends rotatably through the head 81 of the fitting 80. It is to be noted that the axis of the transverse pivot pin 84 is located below and laterally of the center of gravity of the lock member 48 which is represented by the cross lines designated CG.

The cable 85, which at one end is suitably secured to other lap belt section 18, passes around the grooved guide wheel 70. The other end of this cable 85 is connected to the lock member 47 in a manner identical to that illustrated and described for the cable 79 and lock member 48.

The means which yieldingly resist payout of the lap belt section 19 and associated cable 79 comprises the elongated helical tension spring 86 housed in the compartment 23, one end of which spring is suitably anchored to the frame 16. As shown, the anchored end of the spring is connected to an anchor button 88 secured to the upper flange 29. The spring 86 extends over the abutment members 42, passes around the guide wheel 71 and has its other end shown as connected to the head 81 of the cable termination fitting 80, as indicated at 89. Referring to FIG. 2, it will be seen that the line of force exerted by the lower reach of the spring 86, that is the portion between the lock member 48 and the guide wheel 71, is in alinement with the line of force exerted by the lower reach of the cable 79, that is the portion of the cable between the lock member 48 and the guide wheel 63.

Similarly the other compartment 24 houses the return spring 90, this spring being suitably anchored one end to the frame 16, passing around the guide wheel 64 and having at its other end effectively connected to the lock member 47 in a manner identical to that described for the lock member 48.

Referring to FIG 2, one end of the frame 16 is provided with a fixed guide block 91 which has an upright guide opening 92 therethrough through which the cable 79 slidably extends. The block 91 is shown as being notched to receive the upper flanges 29 and 33 of the frame and as being secured to the cover plates 36 and 38 by a nut and bolt fastening means 93 extending transversely through these walls and the block 91. A similar stationary guide block 94 is shown at the opposite end of the frame and secured by transverse fastening means 95. One end of the frame 16 is also shown as connected by the fastening means 93 and similar means 96 to an attaching bracket 97 which enables the frame 16 to be secured to the frame of the chair 11. A similar bracket 98 for the same purpose is at the other end of the frame 16 and is connected thereto by the fastening means 95 and similar means 99.

The form of the safety belt type restraint apparatus shown in FIGS. 1 through 11 can be understood best, it is believed, by describing solely the action of the lock member 48, although its action will be duplicated by the other lock member 47.

When the chair 11 is unoccupied, it will be seen that the return springs 86 and 90 will hold their respective lap belt sections 19 and 18 in the condition shown in FIG. 1 in which these sections extend partially into the arm rests 14 and 15 of the chair. After the passenger occupies the chair, he manually withdraws the belt sections sufficiently to hook together or couple the fastener portions 21 and 22. During such payout movement, the lock members 48 and 47 will move translationally horizontally under the row of abutment members 42 with their toe portions 52 and 53 sliding along the upper surface of the respective lower flanges 28 and 32, as represented by the lock member 48 in full lines at the left in FIG. 2. After the belt sections have been so joined, manually releasing them will allow the retriever springs 86 and 90 to take up any slack in the joined lap belt. With the lap belt so worn, the passenger may move forward, turn or bend over, being relatively free to do so since during such maneuvering his body is merely pulling on the cables 79 and 85 against the urging of the respective return springs 86 and 90.

However, should the wearer move relative to his chair so quickly as to pull the lock members 47 and 48 by means of the joined lap sections 18 and 19 which extend across the lap of the wearer and thereby produce a payout acceleration above a predetermined value, the lock members will lock up to prevent further lap belt payout. What happens to produce this effect is more apparent from an examination of FIG 7. There a sharp rightward horizontal pull on the cable 79 acts through the axis of the pivot pin 84 and is represented by the force vector $F_p$. This produces a leftward horizontal inertia force acting through the center of gravity of the lock member 48, such force being represented by the vector $F_i$ and having the same magnitude as $F_p$. Since $F_i$ and $F_p$ are equal although opposite, the effective lever arm for $F_i$ is the vertical distance to the axis of the pivot pin 84. When the couple produced by the vector $F_i$ times its effective vertical lever arm extending to the axis of the pivot pin 84 and thereby acting in a counterclockwise direction about the fulcrum 55 exceeds the clockwise-acting couple produced by the weight of the lock member 48 (or appropriate portion thereof due to its inclined installation) represented by the vertical vector W times its lever arm which is the horizontal distance between this vector W and the fulcrum 55, a net inertia lock up couple represented by the curved arrow 100 will be effective to pivot the lock member in a counterclockwise direction about the fulcrum 55. This will move the lock member 48 from the unlocked condition shown at the left in FIG. 2 to the locked up condition shown in FIG. 7 in which a new balance of forces exists due to the lock member forcefully engaging one of the abutment members and the floor of its compartment. In so moving, the lock member 48 tips upwardly off its toe portion 52, 53 onto its heel portion 54 thereby to lift the locking notch 60 and dispose it in the path of one of the abutments provided by the row of transverse rivets 42. The effect of the lock member 48 lockingly engaging one of the abutment members 42 is to prevent further payout of the cable 79 and thereby restrain the lap belt and hold the passenger to the chair.

Referring to FIG 1, it will also be noted that the frame 16 is inclined upwardly and forwardly with respect to the horizontal. This angle of inclination is in the range of from 30° to 50°, preferably 40°. Such non-horizontal arrangement of the frame 16 disposes the lock members 47 and 48 in a similarly inclined position. This renders them sensitive to momentum directly and capable of being locked up without having to be pivoted due to payout of the belt sections 18 and 19. This momentum sensitivity is diagrammatically illustrated in FIG. 9 wherein the horizontal vector 101, indicated illustratively to have a value of 1G, acts on the center of gravity of the lock member 48. Acting through the center of gravity but vertically downwardly is the weight of the lock member 48 and having a value of 1G, represented by the vector 102. The vectors 101 and 102 provide a resultant vector 103. A component vector 104 acting in the inclined plane of movement of the lock member 48 is computed to have a value of .12G. The component vector 104 is directed upwardly along the inclined plane of movement of the lock member 48 and therefore urges this member to a locked up condition with one of the abutment members 42.

In moving into the locked up condition due to momentum, i.e. deceleration in a forward direction above a predetermined value, the lock member 48 is translated upwardly, as illustrated in FIG. 10, so that the toe portion of this member provided by the surfaces 52 and 53 separates from the upper surface of the flange 28, thereby providing a clearance 105 therebetween. As a practical matter, the tendency to lock up by momentum will be assisted by excessive belt payout acceleration because the wearer of the belt will be subjected to momentum also. Payout pull on the fitting 80 will cause the lock member 48 to pivot in a counterclockwise direction as viewed in FIG. 10 until the heel portion provided by the surfaces 53 engages the frame surface 28 thereby placing this member in a fully locked up condition as shown in FIG. 7.

Assuming now that the vehicle such as an airplane in which the safety belt apparatus is arranged should suddenly drop so as to impose negative or upward gravity upon the body of the occupant of the seat which tends to lift him off the seat, this will be restrained. Referring to FIG. 8, the vertical vector 106 represents a negative gravity effect illustrated as .5G. This has a component in the inclined plane of movement of the lock member 48 represented by the vector 108 which computes to a value of .32G. Since this vector component 108 urges the lock member 48 to move upwardly along its inclined plane of movement, this member can move upwardly into locked up condition with one of the abutment members 42. In so moving the lock member 48 may be translated upwardly as depicted in FIG. 10.

For comparison, the vector diagram for the lock member 48 when subjected only to the normal downward weight effect of 1G, is illustrated diagrammatically in FIG. 11. There the weight is represented by the 1G vertical vector 109 which has a component represented by the vector 110 in the inclined plane of movement of the lock member 48. It will be noted that this vector 110 acts downwardly away from the abutment members 42 and therefore urges the lock member 48 toward the bottom of its compartment away from a position in which it could lock up against one of the abutment members.

From the foregoing, it will be seen that the safety belt type restraint apparatus shown in FIGS. 1–11 has a series of lock stations past which the lock members are movable without locking up against any one thereof but each of these lock members is adapted to lock up at one of these stations when the center of gravity of such lock member moves in a direction relatively opposite to or transversely of the payout direction. The motion of the center of gravity toward the row of lock stations in the embodiment shown may be the result of pivotal movement as in case case of when payout acceleration of the belt section exceeds a predetermined value, or may be translational as when deceleration of the vehicle in a given direction such as forward exceeds a predetermined value and also when acceleration of the vehicle in one direction transverse of the last mentioned direction such as downward exceeds a predetermined value.

It will be seen that the sensitivity of the lock member 48 to forward momentum and negative gravity can be adjusted by changing the inclination of the plane in which the lock member is movable, thereby adjusting the magnitude of the locking force component in such plane. Raising such plane closer to vertical increases negative gravity sensitivity but decreases horizontal momentum sensitivity. On the other hand, lowering the plane closer to horizontal decreases negative gravity sensitivity but increases horizontal momentum sensitivity.

It will be observed also that the sensitivity of the lock member 48 to belt payout acceleration can be adjusted by positioning the center of gravity CG vertically and horizontally relative to the fulcrum 55. Thus, if the shape of the lock member is adjusted so as to raise the center of gravity relative to the fulcrum, the sensitivity to belt payout acceleration will be increased whereas it will be decreased if the center of gravity location is lowered relative to the fulcrum. If the fulcrum 55 is horizontally closer to the center of gravity the lever arm for the weight of the lock member is decreased and the sensitivity to belt payout acceleration is increased, but if the fulcrum is horizontally more remote from the center of gravity this sensitivity is decreased.

FIGS. 12–24

The safety belt type restraint apparatus illustrated in FIGS. 12–24 comprises two separate assemblies one represented by the numeral 115 and the other by the numeral 116. In FIG. 12 the assemblies 115 and 116 are duplicated in an automobile seat installation comprising a seat portion 117 and independent back portions 118 and 118a, a pair of assemblies 115 and 116 being associated with the back portion 118 and a similar pair of assemblies 115a and 116a being associated with the back portion 118a. The seat shown in FIG. 12 is illustrated as not being of the type which will permit the various seat belt assemblies 115, 116, 115a and 116a severally to be fastened directly thereto, although this is possible if the seat actually is of a suitable structure to permit of this.

In FIG. 13, the aircraft passenger chair there illustrated comprises a seat portion 119, back portion 120 and arm rests 121 and 122, the latter being phantomly illustrated. Associated with the arm rest 121 is a seat belt assembly represented at 115b, a second seat belt assembly 116b being associated with the other arm rest 122. The assemblies 115b and 116b are identical to the assemblies 115, 116 and 115a, 116a, respectively, except for the omission of the mounting brackets for the frames of the assemblies, the passenger chair shown in FIG. 13 being considered as a structural type sufficient to warrant suitable direct mounting of the frames of the belt assembly thereon.

Referring to FIG. 14 in which the assembly 115 is illustrated as representative of all such assemblies, the assembly is shown as comprising an elongated tubular frame 123 having an attaching bracket 124 at one end adapted to be suitably attached to an eye bolt 125 suitably secured to the vehicle, such as the frame of an automobile suggested at 127 in FIG. 15.

The belt assembly frame 123 is shown as comprising an elongated channel having a bottom wall 126, upstanding side walls 128 and 129 and inturned upper flanges 130 and 131. The side walls 128 and 129 are suitably secured to the mounting bracket 124 as by being welded thereto.

Resting upon the inturned flanges 130 and 131 is a top wall member represented generally by the numeral 132. This top wall carries a row of abutment members indicated individually at 133. These abutment members are shown as being in the nature of louvers, struck out from the top wall 132 and spaced longitudinally therealong and severally extending downwardly and to the left as viewed in FIG. 15. The central portion of the top wall 132 which is formed with the struck out abutment members 133 is preferably depressed as indicated at 134 in FIG. 16. Each of the abutment members 133 has a transverse end face 135.

The top wall 132 is preferably covered and for this purpose a slightly upwardly arched sheet metal cover plate 136 is shown arranged above the wall 132 and has its marginal portions overlying the marginal portions of the top wall 132 which in turn are supported on the frame flanges 130 and 131. A series of self-tapping screws 138 are arranged at intervals in vertically registered holes provided in the aforementioned margins and flanges and serve to secure these elements together.

Movably arranged in the compartment or way between the floor 126 and row of abutment members 133 is a lock member indicated generally at 139. This lock member is shown as made up of a first channel member having upturned flange or arm portions 140, 140 connected by an integral intermediate web portion 141, and also a second channel member having downturned flange or leg portions 142 connected by an integral intermediate web portion 143. The web portions 141 and 143 are arranged back-to-back and are suitably secured together as by being spot welded. The leading or right transverse end portions of the connected and contiguous webs 141 and 143 are shown as being slightly upturned to provide a forwardly facing transverse abutment nose indicated at 144. This nose is adapted to engage any one of the transverse abutment end faces 135 when the nose is in a path of interference with the abutment members and is moving in a forwardly direction or to the right as viewed in the figures.

The bottom edges of the downturned flanges or legs 142 are formed to provide a flat toe portion 145 at the rear end of which there is an upward offset in the configuration of the bottom edge to provide a corner 146 which serves as a fulcrum in a manner hereinafter explained. Rearwardly or to the left of this fulcrum 146 is an upwardly and rearwardly inclined heel portion 148.

The upper edges of the upturned flanges 140 are formed to provide a rearwardly and upwardly inclined surface head portion 137 adjacent the nose 144. The edges continue rearwardly as a generally horizontal low surface portion 147 until a point about vertically opposite the corner 146 where there is an upward offset and rearward extension as a generally horizontal upper surface portion 147'. The surfaces of the head portion 137 and heel portion 148 are substantially parallel to each other.

A lap belt section 149 is shown as having a portion passing around a spool or guide wheel 150 arranged at one end of the row of abutment members 133, the right end as viewed in FIG. 15, and continues horizontally to the left adjacent the frame floor 126 for connection to the lock member 139. For this connection, the lock member is shown as provided with a transverse bar 151 which has reduced ends 152 received in holes 153 provided in the downturned flanges 142 and the belt element 149 is looped around this bar. The material of which the belt 149 is composed may be of any suitable type and construction. However, nylon webbing is preferred and as illustrated a length of this webbing is folded upon itself into two plies to provide a loop at one end which receives the transverse bar 151 and is stitched along its opposite longitudinal edges and suitably secured at its other end to a fastener element 154. In order to lower effectively the line of force exerted by the belt element 149 when pulled upon the lock member 139, a finger 155 is shown as struck out from the lower transverse web 143, the free transverse edge of this finger being curvingly bent upwardly so as to provide a downwardly facing salient which engages the top surface of the belt element 149.

Yieldable means are provided for retrieving the lock member 139. Such means are connected to this lock member so as to exert the retrieving force in a line substantially in alinement with or substantially coplanar with the line of the pull force exerted by the belt element 149. For this purpose, an elastic shock cord 156 is shown as connected at one end to the lock member 139, passing around a guide wheel 158, extending between the top wall 132 and cover plate 136 and having its other end secured to the frame 132 at the remote end of the row of abutment members 133. The periphery of the guide wheel 158 is grooved as indicated at 157 so as to hold the cord thereon. More specifically, the anchored end of the elastic shock cord 156 is suitably secured to an anchor clip 159, best shown in FIG. 20, which extends over the end of the top wall 132 adjacent the guide wheel 150. The cord 156 is shown as secured to the clip 159 by means of clamp fingers 158' which are struck out of the body of the sheet metal clip 159 and bent into grasping contact with the cord. The other end of this cord is shown as similarly secured to a transverse bar 160, the clamp fingers 161 being provided for this purpose. The opposite ends of the bar 160 have reduced end portions indicated at 161' serving as pivot pins which are rotatably received in holes 162 provided in the downturned flanges 142 of the lock member 139.

The elastic shock cord 156 is a spring device and is preferably composed of a plurality of rubber strips covered and confined by a cloth sheath. Such an elastic device eliminates noise which otherwise might occur if the elastic device were a metal spring contacting the metal parts of which the assembly frame 132 is composed. However, any suitable specific type of spring device may be employed.

The guide wheel 158 is also preferably made of plastic material and is shown in FIG. 16 as having an axle 163 arranged transversely of the elongated frame 123 and substantially horizontal with the ends of the axle, being suitably received in the pendant flanges of inverted brackets 164. Upper horizontal flanges 167 of these brackets 164 are shown as being arranged under the depressed portion 134 of the top wall 132 and are suitably secured thereto as by welding. Referring to FIG. 19, the brackets 164 have adjacent their front or right ends an integral transverse web portion 165 on which a stop block 166 is suitably mounted. This stop block 166 is adapted to be abuttingly engaged by the rear end of the lock member 139.

The rear ends of the pendant flange portions of the brackets 164 are also shown as provided severally with outturned flanges 168 as best shown in FIG. 19. These flanges are adapted to support a removable transverse end wall 169 which closes the left end of the tubular frame 132. Removable screws 170 are shown as securing the end wall 169 to the flanges 168.

The spool or guide wheel 150 for the belt element 149, and which is also preferably made of a suitable plastic material, is shown as arranged for rotation about a horizontal axis extending transversely of the assembly frame 132. For this purpose the wheel 150 has a central through opening 171 which receives a sleeve bearing or bushing 172 having an axial length slightly greater than that for the spool or guide wheel 150. The shank of an axle bolt 173 extends through alined holes provided in the mounting bracket 124, frame side walls 128 and 129 and through the central bore of the sleeve bearing 172. The end of the bolt 173 is externally threaded to receive a nut 174. When this nut is tightened, it will be seen that the mounting bracket and frame side walls are clamped against the end faces of the sleeve bearing 172, leaving the spool or guide wheel 150 to be freely rotatable thereon. The periphery of the guide wheel 150 is recessed as indicated at 175 so as to provide a guide groove during the movements around this wheel of the belt element 149.

The belt assembly 116 is identical to the assembly 115 described in detail except that the end of the belt element 149 is provided with a fastener element 176 in the assembly 116. The fastener elements 154 and 176 may be of any suitable construction such as the type shown at 21 and 22 in FIG. 1.

It is pointed out that the frames of the assemblies 115 and 116 are arranged severally so as to extend fore-and-aft of the seat portion of the chair with which they are associated, thus providing a path of movement for the lock member 139 in each assembly which also extends in a fore-and-aft direction. This contrasts with the arrangement of the inventive belt apparatus shown in FIGS. 1–11 in which the lock members 47 and 48 extend longitudinally of the seat portion or laterally of the line of travel of the vehicle supporting the chair, assuming that the chair is facing forwardly in the normal direction of vehicle travel. Notwithstanding this different orientation of the lock members with respect to the seat occupied by the passenger, the lock member 139 will be sensitive to excessive belt payout acceleration.

This is illustrated in FIG. 22 wherein the lock member 139 has a center of gravity CG arranged above and slightly to the right of the fulcrum corner 146. This center of gravity is also arranged above a belt line of force represented by the arrow 178 and applied by a payout pull on the belt element 149 and the inertia force of equal magnitude acting in the opposite direction horizontally through the center of gravity is represented by the arrow 179. In FIG. 22, the lock member is depicted in a locked up condition in which the nose 144 engages the end face 135 of one of the abutment members 133. The inertial lock up couple is depicted by the curved arrow 180 which is effective to pivot the lock member 139 on its fulcrum 146 in a counterclockwise direction so as to swing the heel portion 148 into contact with the upper surface of the frame floor 126 and the head portion 137 into contact with the lower surface of the frame flanges 130 and 131.

FIG. 23 represents the same tipped up and locked up condition of the lock up member 139 shown in FIG. 22 but in FIG. 23 the locked up condition is produced as a result of momentum sensitivity. Assuming that the vehicle carrying the frame 123 shown in FIG. 23 is moving from right to left and is decelerating above a predetermined value, there is a momentum induced force represented by the vector 181 extending horizontally and to the left and through the center of gravity CG. This produces an opposite reactive horizontal force 182 in the belt 149. The tipping moment on the member 139 is force 181 times its vertical lever arm to fulcrum 149 minus force 182 times its vertical lever arm to this fulcrum. Since the two forces 181 and 182 are equal but opposite and the lever arm of the former is greater than that of the latter, the net tipping moment is force 181 times the perpendicular distance to line of force 182. The restoring moment is the weight of the lock member represented by the vector 183 times the horizontal lever arm to fulcrum 146. When the tipping moment exceeds the restoring moment, a counterclockwise movement of the lock member 139 about the fulcrum 146 is produced, thereby tipping up the nose 144 of the lock member into a path of interference with the end face 135 of one of the abutment members 133.

It is to be observed that the momentum sensitivity of the lock member 139 as depicted in FIG. 23 operates to pivot this lock member due to the disposition of this lock member in a fore-and-aft direction parallel to the direction of movement of the vehicle carrying this lock member, whereas in the case of the form of belt apparatus shown in FIGS. 1–11 wherein the lock members moved laterally of the direction of movement of the carrying vehicle, the lock members 47 and 48 are translated into a locked up condition by forward momentum rather than being pivoted into such locked up condition as in the case of the arrangement shown in FIGS. 12–24.

The sensitivity of the lock member 139 to negative or upward gravity is depicted in FIG. 24. As there shown, the lock member 139 is translated upwardly so as to move the center of gravity CG toward the row of abutment members 133. This upward movement is limited by the upper horizontal edges 147′ of the upturned flanges 140 engaging the lower surfaces of the horizontal upper frame flanges 130 and 131. In so moving translationally upwardly, the lock member 139 is lifted off its toe portion 145 so as to provide a clearance between this portion and the upper surface of this frame floor 126, such clearance being indicated at 184. In this impending locked up condition the slightest pull on the belt element 149 will tip the lock member 139 so that its nose 144 engages a transverse abutment end face 135, thereby preventing further payout of the belt element. In FIG. 24 the negative or upward gravity is represented by the vector 185.

During normal payout of the belt element 149 as may occur when the wearer is maneuvering in his seat, the lock member 139 moves freely, except as yieldingly restrained by stretch of the elastic cord 156, along the row of abutments 133 disengaged therewith and with its toe portion 145 sliding on the upper surface of the frame floor 126, as depicted in FIG. 15. However, it is ready to lock up when belt payout acceleration, momentum or negative gravity exceed respective predetermined values.

From the foregoing, it will be seen that the form of safety belt apparatus illustrated in FIGS. 12–24 and which is fabricated essentially of sheet metal components with all of the advantages attending such a construction, has sensitivity to excessive belt payout acceleration, momentum and negative gravity.

Other changes and modifications of the several forms of inventive restraint apparatus shown and described may occur to those skilled in the art without departing from the spirit of the inventive concept disclosed. For example, the restraint assemblies such as the typical one 115 may be arranged generally upstanding along the chair back with the abutment members on the front side and with belt payout at the lower end, suitable mounting of the upper end to the chair back and of the lower end to the seat or vehicle floor being provided. In such an arrangement the operation is the same as that described for the form of the invention shown in FIGS. 12–24 except that the momentum and negative gravity lock up modes are reversed. Further in applications where gravity sensitivity is undesired as for example in weightless space work, the lock member may be so designed that its center of gravity is behind the fulcrum rather than ahead or on the payout side as shown in the embodiments illustrated, but even so the center of gravity would still be moving in a direction relatively opposite to the payout direction. Also, with no gravity sensitivity, a spring load or a guide rail might be used to hold the lock member at the bottom of its way. All of these forms are regarded as illustrative and not limitative of the invention, the scope of which is to be measured by the appended claims.

What is claimed is:

1. In restraint apparatus, the combination comprising means providing a series of stationary lock stations, a lock member opposing said stations and movable therealong, a movable restraining element, and means arranged to apply a couple to said member responsive to payout of said element effective to tip said member into a locked up condition at any one of said stations.

2. In restraint apparatus, the combination comprising means providing a series of lock stations, a movable lock member opposing said stations and normally not locked up at one of said stations, and a movable restraining element having a normally free payout and operatively associated with said member to apply a pull force thereto which does not pass through the center of gravity of said member, whereby said member may move translationally past said stations without locking up but is adapted to lock up at one of said stations when said center of gravity moves in a direction opposite to that of said pull force.

3. In restraint apparatus, the combination comprising means providing a series of lock stations, a lock member opposing said stations and normally translationally movable therealong without locking up at one of said stations but tippable to lock up at one of said stations, and a movable restraining element having a normally free payout and operatively connected to said member at a place effectively offset from the center of gravity of said member, whereby said member is adapted to lock up at one of said stations when said center of gravity moves in a direction opposite to that of the pull force applied by said element.

4. In restraint apparatus, the combination comprising means providing a series of lock stations, a lock member normally movable in one direction to pass said stations without locking up at any one thereof but adapted to lock up at one of said stations when the center of gravity of said member moves transversely of said direction, and a movable restraining element connected to said member and having a normally free payout.

5. In restraint apparatus, the combination comprising a generally straight row of spaced abutments, a lock member arranged laterally of said abutments and normally movable therealong in a payout direction, a movable restraining element having a normally free payout and effectively connected to said member at a place offset from its center of gravity, whereby said member may move past said abutments without lockingly engaging any one thereof but is adapted to lock up against one of said abutments when said center of gravity moves in a direction relatively opposite to said payout direction, and means for retrieving said member in said opposite direction.

6. In restraint apparatus, the combination comprising a generally straight row of spaced fixed abutments, a lock member arranged laterally of said abutments and movable therealong in a payout direction, a movable restraining element effectively connected to said member at a place offset from its center of gravity, whereby said member may move past said abutments without lockingly engaging any one thereof but is adapted to lock up against one of said abutments when said center of gravity moves in a direction relatively opposite to said payout direction, and yielding means resisting movement of said member in said payout direction due to payout of said element and operative to move said member in said opposite direction when the effective force of said means overcomes the effective payout force on said element.

7. In restraint apparatus, the combination comprising a generally straight row of spaced fixed abutments, a lock member arranged laterally of said abutments and movable therealong in a payout direction, a movable restraining element effectively connected to said member at a place offset from its center of gravity, whereby said member may move past said abutments without lockingly engaging any one thereof but is adapted to lock up against one of said abutments when said center of gravity moves in a direction relatively opposite to said payout direction, and yielding means resisting movement of said member in said payout direction due to payout of said element and operative to move said member in said opposite direction when the effective retrieving force exerted by said means on said member overcomes the effective payout force exerted by said element on said member, said retrieving and payout forces acting along lines lying substantially in the same plane.

8. In restraint apparatus, the combination comprising an elongated frame, a row of spaced transverse abutments arranged along said frame, a movable lock member arranged laterally of said abutments, a rotatable guide wheel arranged at each end of said frame, a restraining section including a connecting element passing around one of said wheels and attached to said member effectively offset from the center of gravity of said member and movable in a payout direction, a return spring device connected at one end to said member and passing around the other of said wheels, and means anchoring the other end of said device to said frame, the pull forces exerted by said connecting element and spring device upon said member being substantially in line with each other, said lock member being movable along said row of abutments in said payout direction without lockingly engaging any one of said abutments but being adapted to lock up against one of said abutments when said center of gravity moves in a direction relatively opposite to said payout direction.

9. In restraint apparatus, the combination comprising means providing an elongated way, a row of abutments spaced longitudinally of said way and severally extending transversely thereof, a movable lock member arranged laterally of said abutments, and a restraining element connected to said lock member at a place spaced from and effectively offset from the center of gravity of said lock member and movable in a payout direction extending generally parallel to said row of abutments, said lock member being movable from an unlocked condition to a locked up condition in which one of said abutments is lockingly engaged when said center of gravity moves in a direction relatively opposite to said payout direction, said lock member including a toe portion engaging said way when said lock member is in said unlocked condition, a heel portion inclined with respect to said toe portion and a fulcrum intermediate said toe and heel portions, said lock member being pivotal on said fulcrum to disengage said toe portion and engage said heel portion with said way when moving from said unlocked condition to said locked up condition.

10. In restraint apparatus, the combination comprising means providing an elongated way, a row of abutments spaced longitudinally of said way and severally extending transversely thereof, a movable lock member arranged laterally of said abutments, a restraining element connected to said lock member at a place spaced from and effectively offset from the center of gravity of said lock member and movable in a payout direction extending generally parallel to said row of abutments, and return spring means effectively connected to said member, the opposing pull forces exerted by said restraining element and spring means upon said member being substantially in line with each other, said lock member being movable from an unlocked condition to a locked up condition in which one of said abutments is lockingly engaged when said center of gravity moves in a direction relatively opposite to said payout direction, said lock member including a toe portion engaging said way when said lock member is in said unlocked condition, a heel portion inclined with respect to said toe portion and a fulcrum intermediate said toe and heel portions, said lock member being pivotal on said fulcrum to disengage said toe portion and engage said heel portion with said way when moving from said unlocked condition to said locked up condition.

11. In restraint apparatus, the combination comprising an elongated guide surface, a row of abutments spaced longitudinally along said surface in spaced relation thereto and severally extending transversely thereof, a movable lock member arranged laterally of said abutments, and a restraining element connected to said lock member at a place spaced from and effectively offset from the center of gravity of said lock member and movable in a payout direction extending generally parallel to said row of abutments, said lock member being movable from an unlocked condition to a locked up condition in which one of said abutments is lockingly engaged when said center of gravity moves in a direction relatively opposite to said payout direction, said lock member including a toe portion engaging said surface when said lock member is in said unlocked condition, said lock member having a clearance between a portion thereof and said abutments when said toe portion engages said surface, said lock member being translatable laterally to destroy said clearance and place said lock member in a path of interference with one of said abutments and thereby lock up said lock member, said lock member also having a heel portion inclined with respect to said toe portion and a fulcrum intermediate said toe and heel portions, said lock member being pivotal on said fulcrum to disengage said toe portion and engage said heel portion with said surface when pivoting from said unlocked condition to said locked up condition.

12. In restraint apparatus, the combination comprising an elongated guide surface, a row of abutments spaced longitudinally along said surface in spaced relation thereto and severally extending transversely thereof, a movable lock member arranged laterally of said abutments, and normally not lockingly engaging one of said abutments, a restraining element connected to said lock member at a place spaced from and effectively offset from the center of gravity of said lock member and normally freely movable in a payout direction extending generally parallel to said row of abutments, and return spring means effectively connected to said member, the opposing pull forces exerted by said restraining element and spring means upon said member being substantially in line with each other, said lock member being movable from an unlocked condition to a locked up condition in which one of said abutments is lockingly engaged when said center of gravity moves in a direction relatively opposite to said payout direction.

13. In restraint apparatus, the combination comprising means providing an elongated way, a row of abutments spaced longitudinally of said way and severally extending transversely thereof, a lock member when in an unlocked condition being slidable along said way but when in a locking condition lockingly engaging one of said abutments, said lock member including a pair of transversely spaced legs severally having a foot end including a substantially flat toe portion engaging said way when said lock member is in said unlocked condition and a substantially flat heel portion engaging said way when said lock member is in said locked condition, said heel portion being inclined to said toe portion to provide a salient therebetween which serves as a fulcrum about which said lock member may swing when moving from one to the other of said conditions, a transverse pin carried by said legs, a restraining section including a pull element extending between said legs and connected to said pin so as to have pivotal movement relative to said lock member about the axis of said pin, a return spring device anchored at one end and having its other end connected to said lock member so as to exert a return force substantially in line with any pull force exerted by said element, the center of gravity of said lock member being located between such force line and said row, said lock member being sensitive to payout acceleration of said element, such payout acceleration when below a predetermined value pulling said lock member on its said toe portions along said way in said unlocked condition thereby permitting payout of said element but when said payout acceleration is above said value an inertia lock up couple is produced to cause said lock member to swing onto its said heel portions and into said locked condition and thereby prevent further payout of said element, the greater the perpendicular spacing between said force line and center of gravity and more sensitive said lock member is to payout acceleration of said element.

14. In restraint apparatus, the combination comprising means providing two elongated compartments side by side and including an inner wall and outer walls spaced transversely therefrom and arranged on opposite sides of said inner wall, said inner wall having a plurality of out-of-round holes extending therethrough transversely thereof and spaced apart in a row, a plurality of parallel elongated abutment members each out-of-round in cross-section and severally fittingly extending through said holes and having their opposite ends secured to said outer walls, first and second lock members severally arranged in said compartments on the corresponding side of said abutment members and adapted to move longitudinally of their respective said compartments and also laterally into locking engagement with said abutment members, a pair of guide wheels arranged severally in said compartments at one end of the row of said abutment members and rotatable about a common axis extending transversely of said walls, another pair of guide wheels arranged severally in said compartments at the other end of said row of said abutment members and rotatable about a common axis extending transversely of said walls, a belt having two strap sections each including a connecting element attached to the corresponding one of said lock members, one of said connecting elements passing around one of said guide wheels in one of said compartments at one end thereof and the other of said connecting elements passing around that one of said guide wheels which is arranged in the other of said compartments at the other end thereof, and a pair of return spring devices severally anchored at one of their ends, severally passing around the remaining two of said guide wheels and having their other ends severally connected to said lock members.

15. In restraint apparatus, the combination comprising an elongated tubular sheet metal frame having a wall, a row of abutment members struck out from said wall and spaced longitudinally along said frame and severally extending inwardly and longitudinally thereof and terminating with a transverse abutment end face, a lock member movably arranged within said frame and normally not lockingly engaging one of said end faces, and a restraining element connected to said lock member at a place spaced from and effectively offset from the center of gravity of said lock member and normally freely movable in a payout direction extending generally parallel to said row of abutment members, said lock member being movable from an unlocked condition to a locked up condition in which one of said end faces is lockingly engaged when said center of gravity moves in a direction relatively opposite to said payout direction.

16. In restraint apparatus, the combination comprising an elongated tubular sheet metal frame having a wall, a row of abutment members struck out from said wall and spaced longitudinally along said frame and severally extending inwardly and longitudinally thereof and terminating with a transverse abutment end face, a lock member movably arranged within said frame and including a transverse intermediate portion, laterally turned arm portions on one side of said intermediate portion and laterally turned leg portions on the other side of said intermediate portion, a restraining element effectively pivotally connected to said lock member laterally of its said transverse intermediate portion and also laterally of its center of gravity, and a return spring device pivotally connected to said lock member, the lines of the pull forces exerted by said restraining element and spring device upon said lock member lying substantially in the same plane, said lock member being movable from an unlocked condition to a locked up condition in which one of said end faces is lockingly engaged when said center of gravity moves in a direction relatively opposite to that of said line of force exerted by said restraining element.

17. In restraint apparatus, the combination comprising an elongated tubular sheet metal frame having a wall, a row of abutment members struck out from said wall and spaced longitudinally along said frame and severally extending inwardly and longitudinally thereof and terminating with a transverse abutment end face, a lock member movably arranged within said frame and including a first channel member having first flange portions connected by a first intermediate web portion and also including a second channel member having second flange portions connected by a second intermediate web portion, said web portions engaging each other and being connected together and providing a transverse abutment nose adapted to engage one of said end faces, a transverse bar carried by said second flange portions, said second web portion having a finger element struck out therefrom and extending laterally and longitudinally of said frame, a restraining element connected to said bar and passing said finger element and engaging the same, and a return spring device pivotally connected to said second flange portions, the lines of the pull forces exerted by said restraining element and spring device upon said lock member lying substantially in the same plane laterally of the center of gravity of said lock member, said lock member being movable from an unlocked condition to a locked up condition in which one of said end faces is abutting said nose when said center of gravity moves in a direction relatively opposite to that of said line of force exerted by said restraining element.

18. In restraint apparatus, the combination comprising an elongated tubular sheet metal frame having first and second spaced walls, a row of abutment members struck out from said first wall and spaced longitudinally along said frame and severally extending inwardly and longitudinally thereof and terminating with a transverse abutment end face, a lock member movably arranged within said frame between said walls and including a first channel member having first flange portions opposing said first wall and connected by a first intermediate web portion and also including a second channel member having second flange portions opposing said second wall and connected by a second intermediate web portion, said web portions engaging each other and being connected together and providing a transverse abutment nose adapted to engage one of said end faces, said second flanges having toe edges adjacent said nose and heel edges inclined with respect to said toe edges leaving a fulcrum between said toe and heel edges, said first flanges having inclined head edges generally parallel to said heel edges, a restraining element effectively pivotally connected to said lock member between said second web portion and said toe and heel edges, the center of gravity of said lock member being between such pivotal connection and said head edges, and a return spring device pivotally connected to said lock member, the lines of the pull forces exerted by said restraining element and spring device upon said lock member lying substantially in the same plane, said lock member being movable from an unlocked condition in which said toe edges engage said second wall to a locked up condition in which said head edges and heel edges engage said first and second walls, respectively, and also in which one of said end faces is abutting said nose when said center of gravity moves in a direction relatively opposite to that of said line of force exerted by said restraining element.

19. In restraint apparatus mounted on a vehicle movable in a given direction, the combination comprising a movable restraining element, and means including a movable lock member connected to said element for controlling the payout thereof and moving to a locked up condition to prevent payout when payout acceleration of said element exceeds a predetermined value and said member also moving to a locked up condition to prevent payout of said element independent of said payout acceleration when deceleration of said vehicle in said given direction exceeds a predetermined value, said member also moving to a locked up condition to prevent payout of said element when the additive effects of any payout acceleration of said element below its said value and deceleration of said vehicle in said given direction below its said value induce such movement.

20. In restraint apparatus mounted on a vehicle movable in a generally horizontal direction, the combination comprising a movable restraining element having a normally free payout, and means including a movable lock member connected to said element for controlling the payout thereof and moving to a locked up condition to prevent payout when payout acceleration of said element exceeds a predetermined value and said member also moving to a locked up condition to prevent payout of said element independent of said payout acceleration when deceleration of said vehicle in said generally horizontal direction exceeds a predetermined value and said member further moving to a locked up condition to prevent payout of said element independent of said payout acceleration and said deceleration when said vehicle moves vertically downwardly with an acceleration above a predetermined value, said member also moving to a locked up condition to prevent payout of said element when the additive effects of any payout acceleration of said element below its said value, horizontal deceleration of said vehicle below its said value and vertically downward acceleration of said vehicle below its said value induce such movement.

References Cited by the Examiner

UNITED STATES PATENTS

| 1,895,222 | 1/1933 | Johnson | 280—150 |
| 2,568,930 | 9/1951 | Parsons | 297—386 X |
| 2,650,655 | 9/1953 | Neahr et al. | 297—386 |
| 2,708,555 | 5/1955 | Heinemann et al. | 297—386 X |
| 2,708,966 | 5/1955 | Davis | 297—386 |
| 2,953,315 | 9/1960 | Lautier et al. | 297—386 X |
| 3,122,339 | 2/1964 | Whittingham | 242—107.4 |
| 3,138,405 | 6/1964 | Hanway | 297—386 |

FRANCIS K. ZUGEL, *Acting Primary Examiner.*

FRANK B. SHERRY, CASMIR A. NUNBERG,
*Examiners.*

R. B. FARLEY, *Assistant Examiner.*